United States Patent [19]

van de Leemput et al.

[11] 4,434,083

[45] Feb. 28, 1984

[54] PROCESS OF PREPARING A CATALYST COMPONENT AND POLYMERIZATION OF α-OLEFINS WITH SUCH A CATALYST COMPONENT

[75] Inventors: Lambertus J. M. A. van de Leemput, Echt; Godefridus A. H. Nooijen, Helden-Panninger, both of Netherlands

[73] Assignee: Stamicarbon B. V., Geleen, Netherlands

[21] Appl. No.: 405,375

[22] Filed: Aug. 5, 1982

[30] Foreign Application Priority Data

Aug. 6, 1981 [NL] Netherlands ..................... 8103704

[51] Int. Cl.³ ........................... C08F 4/64; C08F 4/68
[52] U.S. Cl. ............................. 502/154; 526/124; 526/129; 526/151
[58] Field of Search ............... 252/429 B, 429 C, 430

[56] References Cited

U.S. PATENT DOCUMENTS

| | | | |
|---|---|---|---|
| 3,591,656 | 7/1971 | Kroll | 252/429 C X |
| 3,787,384 | 1/1974 | Stevens et al. | 252/429 C X |
| 4,148,754 | 4/1979 | Strobel et al. | 252/429 C |
| 4,263,171 | 4/1981 | Shida et al. | 252/429 C |

Primary Examiner—Patrick Garvin

[57] ABSTRACT

This invention discloses a process of preparing a catalyst component for the polymerization of α-olefins. An organomagnesium compound is deposited on an inert inorganic support, such as silica, and the product obtained is heated at a temperature of 300°–1000° C. in a non-reducing atmosphere. The support is then combined with one or more compounds of titanium and/or vanadium. The process of polymerizing α-olefins with the catalysts of this invention is also disclosed.

11 Claims, No Drawings

PROCESS OF PREPARING A CATALYST COMPONENT AND POLYMERIZATION OF α-OLEFINS WITH SUCH A CATALYST COMPONENT

BACKGROUND OF THE INVENTION

This invention relates to a process of preparing Ziegler-type catalyst components containing titanium and/or vanadium and magnesium, for the polymerization of α-olefins, by contacting an inert inorganic support successively with an organomagnesium compound and one or more compounds of titanium and/or vanadium.

The invention relates also to the polymerization of α-olefins having 2–8 carbon atoms, optionally together with an amount not exceeding 20 mole % of one or more other α-olefins having 2–15 carbon atoms, using these catalysts.

The use of such catalyst components is known from, for example, U.S. Pat. No. 3,787,384 where a support of silica, alumina or a mixture thereof is contacted with either a hydrocarbyl magnesium, a hydrocarbyl halogen magnesium, a hydrocarbyl aluminum, or a hydrocarbyl halogen aluminum compound, followed by an excess amount of a halogen compound of a transition metal, particularly titanium or vanadium.

Further, from German Patent Application No. 25 43 219 it is known to prepare a catalyst component by contacting silica with a magnesium compound and by contacting the resulting product with a titanium and/or vanadium compound.

From U.S. Pat. No. 4,173,547 catalyst components are known wherein a support material is contacted with an aluminum halogen compound, an organomagnesium compound, and a tetravalent titanium compound and/or a compound of another transition metal of group IV—IV in its highest valence, in the order given.

U.S. Pat. Nos. 3,993,588; 4,082,692; 4,087,380 and 4,256,865 disclose processes for preparing supported titanium and magnesium catalyst components involving the joint fluidization, in an inert gas stream and at a temperature of 150°–1000° C., of a silica support and a water-free magnesium halide or magnesium alkoxide compound, and the subsequent incorporation of a titanium compound in the product thus obtained.

With respect to each of the catalyst components noted above, the objective is to achieve the highest possible activity (i.e., the polymer yield per gram of active catalyst) as well as other suitable properties, particularly those regarding molecular weight distribution, particle size, and particle size distribution of the polymer powders obtained. Indeed, it is possible to achieve favorable polymer properties with these known catalyst components but their activity has proven to be substantially less than what was envisioned. It is additionally known (cf. R. Spitz et al, Eur. Pol. Journ., Vol. 15, pp. 441–444) that the activity of these catalysts strongly decreases during the copolymerization of ethylene with α-olefins having 3–10 carbon atoms, in particular hexylene, and that during the copolymerization considerable amounts of polymer waxes are produced which cause serious problems by depositing on the reactor wall.

SUMMARY OF THE INVENTION

The present invention makes it possible to prepare α-olefin polymers having very good physical properties, and in excellent yield by polymerizing one or more α-olefins in the presence of a Ziegler-type catalyst prepared by a process comprising the steps of:

a. forming a catalyst component by combining a particulate inorganic support with a solution of an organomagnesium compound;

b. heating said catalyst component in a non-reducing atmosphere at a temperature of 300°–1000° C.; and c. forming the catalyst by combining the heat-treated catalyst component with at least one compound of one or more metals selected from the group consisting of titanium and vanadium.

The new catalysts of the invention are ideally suited for the preparation of polymers of α-olefins having 2–8 carbon atoms, optionally together with amounts not exceeding 10 mole % of one or more other α-olefins having 2–8 carbon atoms, and are particularly suited for the preparation of polyethylene. Surprisingly, the new catalysts of the invention have also been found suitable for the copolymerization of ethylene with amounts not exceeding 20 mole % of α-olefins having 3–12 carbon atoms, preferably hexylene or octene, linear low-density polyethylene being obtained in good yields without a considerable deposition of polymer on the reactor wall.

It is generally known that the polymerization rate of alkenes with 3–12 carbon atoms is lower than that of ethylene. As a consequence, if ethylene is to be copolymerized with a particular mole percentage of such an alkene, there will have to be more, sometimes even considerably more of the alkene to be copolymerized with ethylene in the reaction mixture. One of average skill in the art is familiar with this and will have little trouble in determining the desired proportions in the reaction mixture.

Research by applicant has revealed that the heat treatment to which the catalyst component is subjected before being contacted with the titanium and/or vanadium compound(s) has a very favorable effect on the properties of the catalyst ultimately obtained. It is assumed, but this statement is not to be construed as committing or limiting applicant, that the heat treatment changes the linkage between the active ingredients of the catalyst component and the support material, thereby enhancing the properties of the catalyst obtained.

The support to be used in the process according to the present invention is preferably a porous particulate inorganic support, e.g., an oxide or a salt. The nature of the support can influence the activity of the catalyst and the properties of the polymer. Particles larger than 200 microns should not normally be used because coarse support materials yield less favorable results, e.g., a low bulk density. It is preferred to use a support which has a mean particle size of less than 100 micron. Although very fine support material can be used, practical considerations dictate the use of a support having a particle size of at least 0.1 micron and preferably at least 1 micron. If fine support material is used, the particle size of the polymer will generally be smaller than if coarser support material is used. An optimum particle size of the support can be established experimentally due to the fact that, beyond a certain particle size, the polymer particle size appears to decrease.

Examples of suitable supports are oxides or hydroxides of magnesium or calcium, silica, alumina, mixed silica/alumina, zirconium oxide, thorium oxide, etc. Among these oxides, silica, alumina and mixed silica/alumina are preferred, and silica is most preferred.

The particle size distribution of the support generally does not affect the activity of the catalyst, but it does affect the polymer, in particular the free flow properties thereof. A narrow support particle size distribution is therefore desirable, and will result in a correspondingly narrow particle size distribution of the polymer obtained.

Inorganic supports should preferably have a high internal porosity. That is, the pore volume of the support should constitute a considerable portion of the volume of the particles. The internal porosity is defined as the ratio of the pore volume to the material weight and is determined on the basis of the technique known by the name of BET, described by S. Brunauer, P. Emmett, E. Teller in Journal of the American Chemical Society, 60, pp. 209-319 (1938). For the present invention, particulate supports having an internal porosity of more than 0.6 cm$^3$/g are desirable. The porous supports used within the scope of the invention generally have a specific area exceeding 50 m$^2$/g, usually on the order of 150 to 500 m$^2$/g. These specific areas are measured in accordance with the above-mentioned technique of Brunauer, Emmett and Teller using a standardized method such as the one described in British Standards BS 4359, Part 1 (1969). Before or after preparation, the silica can in a known manner be provided with other components such as fluorine, if desired. Also, compounds can be applied during or after the activation of the catalysts, if desired.

Since organometallic compounds react with water, the support should be dry. However, drying at extreme temperatures is not required and may sometimes even be undesirable, as small amounts of moisture often prove harmless and may even lead to heightened activity, as can easily be established by experiment. Water physically bound to the support, however, must be removed completely. Suitable oxidic supports usually contain small amounts of chemically bound water, which are determined as the amount of OH groups per gram.

The porous supports which are used are advantageously subjected to a thermal treatment prior to the contacting of the supports with the organomagnesium compound. This treatment is carried out at a temperature of 100°-1000° C., preferably 300°-800° C. The temperature at which the support is heated is chosen below the temperature at which the support material starts to sinter to prevent a decrease of the pore volume and the specific area. It is preferred to conduct the treatment at atmospheric pressure and in an inert atmosphere although pressure and atmosphere conditions are not critical. The duration of the heat treatment is not critical and generally lasts between 1-24 hours.

"Organomagnesium compounds" should be understood to denote magnesium compounds having at least one magnesium-carbon bond, such as magnesium dihydrocarbyl compounds and magnesium alkoxyhydrocarbyl compounds. Organomagnesium compounds preferably used are compounds having the formula MgR$_2$, where the symbols R independently denote a hydrocarbyl group having 1-30 carbon atoms, including alkyl, aryl, cycloalkyl, aralkyl, alkenyl or alkadienyl radicals, preferably alkyl or cycloalkyl radicals.

Examples of magnesium compounds suitable for the process of the invention are diethyl, dipropyl, diisopropyl, dibutyl, diisobutyl, ethylbutyl, diamyl, dihexyl, dioctyl, didecyl, and didodecyl magnesium. Suitable exemplary dicycloalkyl magnesium compounds are those having identical or different cycloalkyl groups with 3-12 carbon atoms, preferably 5 or 6 carbon atoms. An alkyl and a cycloalkyl group may also be bonded to magnesium. Of the aromatic magnesium compounds that are useful, diphenyl magnesium is mentioned in particular. It is preferred to use a dialkyl magnesium having 1-10, in particular 4-10, carbon atoms in the alkyl group. The organomagnesium compounds can be prepared according to the process of Dutch Patent Specification No. 139981 or according to any other suitable method for the preparation of ether-free solutions.

In the preparation of the catalyst component, the organomagnesium compound is preferably dissolved in an inert solvent. To effect dissolution of the organomagnesium compound, a complexing organometallic compound of another metal, for example an aluminum alkyl or lithium alkyl compound, can very suitably be used. Linear or branched aliphatic hydrocarbons, such as butanes, pentanes, hexanes, heptanes or mixtures including gasoline, kerosene, gas oil or other mineral oil fractions are used as solvents, but cyclic hydrocarbons such as cyclopentane, cyclohexane, methylcyclohexane, and aromatic hydrocarbons may also be used. On a technical scale, aliphatic hydrocarbons are preferably used.

To form the catalyst component the solution of the organomagnesium compound is contacted with the particulate inorganic material or with a suspension thereof at ambient temperature and with stirring for about 1 minute to 1 hour. The solvent is separated by decanting on evaporation, under vacuum if required. The catalyst component is subsequently heated at a temperature of 300°-1000° C. in a non-reducing atmosphere such as oxygen, air, nitrogen, carbon dioxide or a noble gas. It is preferred to carry out the heat treatment in an oxidizing atomosphere such as oxygen, air, or air of reduced or increased oxygen content. Preferably, the supported magnesium compound is heated at 400°-800° C., most preferably at 500°-600° C. The heating periods may vary from a few seconds to tens of hours or more. At temperatures of 500°-600° C., the heating period will geneally range between 30 minutes and 6 hours. An optimum heating period for the catalys can easily be determined experimentally by preparing catalysts having identical compositions and under identical conditions except for the heating period, which is varied. The optimum heating period may then be determined by correlation with desired polymerization properties of the ultimate catalyst.

When the organomagnesium compound used is a dihydrocarbyl magnesium compound, it is recommended to subject the catalyst component to a treatment whereby the hydrocarbyl groups are deactivated, prior to the heating treatment. This treatment may be effected by reacting the catalyst component with oxygen or air under controlled conditions, or by reacting the catalyst component with an alcohol.

After the heating treatment in a non-reducing atmosphere and after cooling, the catalyst component is combined with titanium and/or vanadium compound(s) to form the catalyst. The compounds preferred are titanium halides, in particular titanium tetrachloride, titanium alkoxides or alkoxyhalides, vanadium halides such as VCl$_4$, vanadyl halides such as VCl$_3$, and dialkoxyvanadium dihalides.

The transition metal in these compounds should in most cases substantially be present in its highest valance. If titanium compounds are used, for example, minor amounts of trivalent titanium can be present. If mixtures of transition metal compounds are used, the components incorporated therein are generally not subject to co-occurrence restriction. Any halide, alkoxide or any mixed compound can be used together with any other compound mentioned above. Further, titanium iodide, which cannot generally be used alone, can in most cases be used in minor amounts along with other titanium compounds. In some instances, this even appears to have a favorable effect on the polymer properties. In addition to titanium and/or vanadium compounds, compounds of other transition metals can also be employed, particularly compounds of molybdenum, zirconium or chromium, such as $MoCl_5$, $ZrCl_4$ and chromium acetylacetonate.

The amounts of magnesium compound and the total amount of transition metal compound(s) should be such that the solid catalyst component contains 0.5–10% by weight of magnesium and 0.5–10% by weight of transition metal(s). The atomic ratio of magnesium to transition metals can vary within wide limits. This ratio technically has no upper limit, but using an amount of magnesium that is grossly in excess generally offers no methodological advantage, and in fact results in economic disadvantage. Said ratio will therefore normally not exceed 100 and will lie between 0.1:1 and 20:1, particularly between 0.5:1 and 10:1.

The solid catalyst obtained as described above is activated with an organoaluminum compound, which is generally selected from the group of aluminum trialkyls, dialkylaluminum halides and alkylaluminum hydrides. Instead of alkyl groups, also one or more unsaturated hydrocarbon radicals can be bonded to the aluminum. Preferably, aluminum trialkyls are employed.

The catalysts of the invention can be used for the polymerization of ethylene, propylene, butylene, pentene, hexylene, 4-methylpentene and other alpha-alkenes having at least 3 carbon atoms and also for mixtures thereof. They can also be used in the copolymerization of one or more α-olefins with polyunsaturated compounds. They are particularly suited to the polymerization of ethylene, optionally together with an amount not exceeding 20 mole % of another α-olefin.

The polymerization can be carried out in a known way, for example by introducing the oragno-aluminum compound with which the catalyst is to be activated into a reactor containing the solvent. Next, the previously prepared catalyst is added, normally in such amounts that the amount of transition metal is 0.001–10 mmole per liter and preferably 0.01–1 mmole per liter. Then gaseous or liquid monomer is introduced. By using a mixture of monomers, copolymers can be prepared. During the polymerization, additional activating organoaluminum compound may be added, the addition being intermittent or continuous. Optionally, the activation prior to the polymerization can be dispensed with altogether so that activation occurs only during the polymerization. The polymerization is carried out at temperatures below the melting point of the polymer, yielding a suspension.

As the solvent to be used during the preparation of the catalyst as well as for the polymerization, any liquid which is inert relative to the catalyst system can be used. Examples are: one or a mixture of saturated linear or branched aliphatic hydrocarbons, including butanes, pentanes, hexanes, heptanes, and pentamethylheptane; mineral oil fractions such as low-boiling or normal gasoline or naphtha, kerosene, gas oil; aromatic hydrocarbons such as benzene or toluene; and halogenated aliphatic or aromatic hydrocarbons, for example tetrachlorethane. The polymerization can additionally be carried out in liquid monomer or in monomer in the supercritical fluid phase. It is preferred to use the aliphatic hydrocarbons or mixtures thereof, in polymerizations conducted on a technical scale due to their relative cheapness.

The polymer suspension obtained during the polymerization can be worked up in a known manner, with the catalyst being deactivated first, and the resulting catalyst residues being extracted with suitable solvents. The catalysts, however, are so active that the low concentration of catalyst residue in the resulting polymer may render a washing step unnecessary.

The polymerization can be carried out discontinuously or continuously, at atmospheric pressure or at elevated pressures up to 2000 kg/cm². By carrying out the polymerization under pressure, the polymer yield is enhanced, resulting in a polymer with a relatively low catalyst residue concentration. It is preferred to carry out the polymerization at pressures between 1–100 kg/cm², and particularly between 10–70 kg/cm².

The process of the invention lends itself to known modifications. The molecular weight, for example, can be controlled by adding hydrogen or other modifiers commonly used for the purpose. The polymerization can also be carried out in several stages arranged in parallel or in series, using different catalyst compositions, temperatures, residence times, pressures, hydrogen concentrations, etc., in each stage, if so desired. It is accordingly possible to prepare products, for example, which have such a wide molecular weight distribution that they have a high so-called flow index, by choosing in one stage conditions, e.g., pressure, temperature and hydrogen concentrations, which yield a polymer of high molecular weight, while choosing in another stage conditions which yield a product of lower molecular weight. For the preparation of polymers having a wide molecular weight distribution, the polymerization is advantageously carried out in two or more stages in which catalysts having different magnesium:transition-metal ratios are used.

With the catalysts of this invention, α-olefins can also be polymerized in the gas phase, i.e. in the absence of a solvent, in a known manner, for example according to the process described for a different catalyst composition of British patent specification No. 1,373,982.

The invention will be further explained by the following examples but is not restricted to them.

EXAMPLE I

To form a catalyst component 112 grams of silica (EP-10, Messrs. Crosfield UK) dried for 4 min. at 200° C. in a dry air stream were suspended in 400 ml of dry heptane. Into this suspension, an 0.35 molar solution of di-n-butylmagnesium was trickled until the heptane contained traces of alkyl. The amount of magnesium solution which could be added was 600 ml. The free alkyl residues were removed by washing with dry heptane. After removal of the heptane, the residual alkyl groups bound to the catalyst component were deactivated by cautiously exposing the product to air.

30 grams of the catalyst component were calcined for 8 hours at 550° C. in a dry air stream (7.5 Nl of air per hour). After cooling, the air was replaced by dry nitrogen. To prepare the catalyst, the cool calcined powder was suspended in 100 ml heptane and 25 ml pure TiCl$_4$ was added. The solution was refluxed for another hour while being stirred. After cooling, the catalyst suspension was separated out by filtration and washed with dry heptane until no more Ti could be detected in the filtrate. The powder was dried in vacuum. By analyzing the dried powdered catalyst for elements it was established that the catalyst contained 3.3% by weight of magnesium and 3.5% by weight of titanium.

Comparative Example A

As described for analogy of the process of Example I, di(n-butyl)magnesium was deposited on 30 g silica (EP-10). The excess dibutylmagnesium was removed by decanting and suspending in dry heptane a number of times. The silica coated with dibutylmagnesium was then suspended in about 100 ml heptane. 25 ml undiluted TiCl$_4$ was now added dropwise with stirring, and the suspension was then boiled with reflux-cooling. The heptane was decanted and the impregnated silica was washed with additional heptane and then dried in vacuum. The dried silica contained 3.1% magnesium and 2.7% titanium.

EXAMPLE II

Into a stirred reactor (5 liters), 1.2 kg dry isobutane is introduced. After the contents of the reactor have been brought to a temperature of 91° C., hydrogen at 2.8 bar is forced in, followed by ethylene, to a total pressure of 27 bar. Next, triethyl aluminum (TEA) is added until the amount of aluminum in the polymerization medium is 25 ppm. Finally, 85 mg of the catalyst described in Example I is added. Polymerization is carried out for 155 minutes, the total pressure in the reactor being kept constant by maintaining the ethylene feed. The contents of the reactor are maintained at 91° C. during the polymerization.

The polyethylene yield is 334,000 grams per gram of Ti. The density of the polyethylene obtained is 961 kg/m$^3$. The melt index (ASTM D1238) is 8.74.

Comparative Example B

Into a stirred reactor (5 liters), 1.2 kg dry isobutane is introduced. After the contents of the reactor have reached a temperature of 90° C., hydrogen at 8 bar is forced in, followed by ethylene to a total pressure of 34 bar. Next, triethyl aluminum (TEA) is added, until the amount of aluminum in the polymerization medium is 25 ppm. Finally, 190 mg of the catalyst described in Comparative Example A is added. Polymerization is carried out for 120 minutes, the total pressure in the reactor being kept constant by maintaining the ethylene feed. The contents of the reaction vessel are maintained at 90° C. during the polymerization.

The polyethylene yield is 59,700 grams per gram of Ti.

EXAMPLE III

Copolymerization of ethylene and hexylene

Into a stirred reactor (5 liters), 1.2 kg dry isobutane and 300 grams of dry 1-hexylene are introduced. After the contents of the reactor have reached a temperature of 90° C., the reactor is pressurized with hydrogen at 1.5 bar, and then with ethylene to a total pressure of 25 bar. Next, triethyl aluminum (TEA) is added, until the amount of aluminum in the polymerization medium is 25 ppm. Finally, 136 mg of the catalyst described in Example I is added. Polymerization is carried out for 140 minutes, the total pressure in the reactor being kept constant by forcing ethylene into the reactor. The contents of the reaction vessel are maintained at 90° C. during the polymerization. No deposition of polymer is observed on the reactor wall, not even after a series of these polymerization tests.

The copolymer yield is 220,000 grams per gram of titanium. The density of the copolymer obtained is 927 kg/m$^3$. The melt index (ASTM D1238) is 0.85.

What is claimed is:

1. A process for preparing a Ziegler-type catalyst for the polymerization of α-olefins, comprising:
   a. forming a catalyst component by combining a particulate inorganic support with a solution of an organomagnesium compound;
   b. heating said catalyst component in a non-reducing atmosphere at a temperature of 300°–1000° C.; and
   c. forming the catalyst by combining the thus heat-treated catalyst component with at least one compound of one or more transition metals selected from the group consisting of titanium and vanadium.

2. The process of claim 1 wherein said particulate inorganic support is silica, alumina, or a mixture thereof.

3. The process of claim 1 wherein said organomagnesium compound has the formula MgR$_2$, wherein each R is independently a hydrocarbyl group having 1–30 carbon atoms.

4. The process of claim 3 wherein each R is independently an alkyl group having 4–10 carbon atoms.

5. Process of claim 1 wherein said transition metal is substantially present in its highest valence.

6. Process of claim 1 or 5 wherein said transition metal compounds are chosen from the group comprising halides, alkoxides, and alkoxyhalides.

7. Process of claim 1 wherein said transition metal compounds is a member of the group comprising titanium tetrachloride, vanadium tetrachloride, vanadyl trichloride, and dialkoxyvanadium dichlorides.

8. Process of claim 1 wherein said catalyst component contains 0.5 to 10% by weight of magnesium.

9. Process of claim 1 or 8 wherein said catalyst contains 0.5 to 10% by weight of transition metal.

10. Process of claim 8 wherein the atomic ratio of magnesium to total transition metals in the catalyst is between 0.1:1 and 20:1.

11. A catalyst prepared by the process of any of claims 1, 2, 3, 4, 7 or 8.

* * * * *